US005410724A

United States Patent [19]

Worthy

[11] Patent Number: 5,410,724

[45] Date of Patent: Apr. 25, 1995

[54] SYSTEM METHOD FOR IDENTIFYING RADIO STATIONS TO WHICH TUNERS ARE TUNED

[76] Inventor: David G. Worthy, 841 E. Marilyn Ave., Mesa, Ariz. 85204

[21] Appl. No.: 16,031

[22] Filed: Feb. 10, 1993

[51] Int. Cl.[6] ..................... H04B 7/00

[52] U.S. Cl. ..................... 455/2; 455/226.4

[58] Field of Search ..................... 358/84; 455/2, 31.1, 455/226.3, 226.4; 348/1; H04N 7/00

[56] References Cited

U.S. PATENT DOCUMENTS

| | | | |
|---|---|---|---|
| 2,552,585 | 5/1951 | Rahmel | 250/6 |
| 2,896,070 | 7/1959 | Fremont et al. | 250/2 |
| 3,126,513 | 3/1964 | Kamen | 325/31 |
| 3,299,355 | 1/1967 | Jenks et al. | 325/31 |
| 3,434,150 | 3/1969 | Wernlund | 346/1 |
| 3,456,192 | 7/1969 | Mixsell et al. | 325/31 |
| 3,800,223 | 3/1974 | Mead | 325/31 |
| 4,577,220 | 3/1986 | Laxton et al. | 358/84 |
| 4,618,995 | 10/1986 | Kemp | 455/2 |
| 5,289,271 | 2/1994 | Watson | 455/2 X |

*Primary Examiner*—Reinhard J. Eisenzopf
*Assistant Examiner*—Philip J. Sobutka
*Attorney, Agent, or Firm*—Lowell W. Gresham; Jordan M. Meschkow

[57] ABSTRACT

An antenna (26) projects a detection zone (28) across a non-intersection portion (16) of a road (10). A scanning receiver (32) couples to and is controlled by a data logging computer (34). This computer (34) commands the receiver (32) to look for one FM local oscillator (LO) signal (22) that may be emitted from within the detection zone (28). If one LO signal (22) is detected, other LO signals (22) that may be detected at the receiver are ignored until the one signal is no longer detectable (90–106). An attenuator allows LO signals 22 emitted from radios (20) in the detection zone (28) at noisy frequencies to have the same likelihood of being detected as LO signals 22 emitted at less noisy frequencies. Detected LO signals (22) are ignored if they are detected for less than a minimum duration (100) or if they are detected for greater than a maximum duration (118). The second of two consecutively detected LO signals (22) is ignored if it occurs within a minimum duration (112) from the previously detected LO signal (22) and exhibits the same frequency (114) as the previously detected LO signal (22). A compiling computer (36) accumulates the data logged by the data logging computer (34) into a spread sheet (134).

25 Claims, 6 Drawing Sheets

86

| TUNING TABLE | | |
|---|---|---|
| LO FREQ. | STATION FREQ. | CALL LETTERS |
| 98.8 | 88.1 | KABC |
| 102.4 | 91.7 | KDEF |
| • • • | • • • | • • • |
| 118.6 | 107.9 | KXYZ |

FIG. 6

| SERIAL NO. | STATION FREQ. | DESCRIPTIVE DATA | DATE | START TIME | END TIME | SIGNAL STRENGTH |
|---|---|---|---|---|---|---|

94

FIG. 7

134

| ☒ | HOUR 1 | | HOUR 2 | | • • • | HOUR 24 | |
|---|---|---|---|---|---|---|---|
| KABC | NO. | % | NO. | % | 136 • • • | NO. | % |
| | OTHER | | OTHER | | | OTHER | |
| KDEF | NO. | % | NO. | % | 136 • • • | NO. | % |
| | OTHER | | OTHER | | | OTHER | |
| • • • | • • • 136 | | • • • | | • • • | • • • 136 | |
| KXYZ | NO. | % | NO. | % | • • • | NO. | % |
| | OTHER | | OTHER | | | OTHER | |

FIG. 10

SYSTEM METHOD FOR IDENTIFYING RADIO STATIONS TO WHICH TUNERS ARE TUNED

TECHNICAL FIELD OF THE INVENTION

The present invention relates generally to RF communications. More specifically, the present invention relates to accurately identifying from a remote location the broadcast stations to which tuners, used by radios, televisions, and the like, are tuned.

BACKGROUND OF THE INVENTION

The commercial broadcast industry and businesses which advertise through the RF broadcast media need to know the sizes of the audiences which are tuned to particular stations at particular times. This need has been met primarily through the use of audience participation surveys. In other words, individuals are asked, either directly or indirectly through equipment coupled to their tuners, to identify the particular stations to which they may be tuned.

The gathering of survey data through audience participation has many problems. For example, the accuracy of this data is questionable. People often feel uncomfortable about truthfully identifying broadcast programming they may be currently experiencing. With respect to radio, a majority of the listening occurs in automobiles. However, listeners cannot practically make a record, accurate or otherwise, of their listening tendencies while driving. Accordingly survey data related to listening in automobiles is particularly suspect because it is compiled from after-the-fact recollections. Furthermore, the people who agree to participate in such surveys may have different listening tendencies than others, and this factor may bias the data.

Cost represents another problem associated with gathering data through audience participation surveys. Often, expensive equipment is provided to survey participants to automatically record listening tendencies. Accuracy may improve, but a great pressure exists to keep sample sizes small to minimize the tremendous costs involved. The smaller sample sizes lead to less accurate survey data. Moreover, the use of tuner-coupled equipment is a wholly impractical alternative in surveying the automotive radio audience due to installation costs and audience reluctance to permit unneeded meddling with their automobiles. Furthermore, money is often given to survey participants to compensate them for their inconvenience. Consequently, survey data obtained through audience participation in the gathering of survey data leads to expensive data of questionable validity.

Over the years, attempts have been made at using passive electronic RF monitoring equipment to remotely identify the stations to which tuners may be tuned. Generally speaking, audiences' tuners use local oscillator signals that are related to the frequencies of the respective stations currently being tuned in. These local oscillator signals are broadcast or otherwise emitted from the tuners as very weak signals that sensitive monitoring equipment can detect.

This remote monitoring technique is desirable because it does not require cooperation from an audience, and a host of inaccuracies and costs associated with audience participation are reduced or eliminated. Large sample sizes may be monitored at low cost relative to audience participation techniques. However, prior art methodologies and systems used to implement the remote monitoring technique have proven unsuccessful.

The failure of prior art remote monitoring systems may be due, at least in part to excessive zeal in recording large sample sizes. In general, larger sample sizes are desirable because they lead to greater accuracy. However, when larger sample sizes include corrupted or otherwise unfairly skewed data, the result can easily be a less accurate survey.

Conventional remote radio monitoring systems have failed to adequately address many different situations that lead to corrupted or skewed survey data. For example, when multiple tuners are located near one other, they may be indistinguishable from one another by the monitoring equipment when they are tuned to the same station. This skews survey data in favor of less popular stations. Moreover, no standards exist for minimum local oscillator signal strength or frequency accuracy. Conventional monitoring equipment may fail to register some stations due to a weak local oscillator signal at a particular tuner and may count another station multiple times at a different tuner. In addition, background noise may cause local oscillator signals at some frequencies to be more readily detectable than at other frequencies, and this noise may skew ratings in favor of some stations at the expense of other stations. Still further, the accuracy of the survey data obtained from conventional equipment depends on the skill and concentration of human operators. This human factor infuses yet another inaccuracy into the survey data.

SUMMARY OF THE INVENTION

Accordingly, it is an advantage of the present invention that an improved system and method for determining the stations to which tuners may be tuned is provided.

Another advantage of the present invention is that audience survey data are gathered without requiring audience participation.

Another advantage is that the present invention gathers audience survey data without requiring a human operator.

Another advantage is that the present invention remotely monitors large sample populations at low cost.

Another advantage is that the present invention improves on the accuracy of audience survey data.

Another advantage is that the present invention improves on the precision conventionally obtainable from audience survey data.

Another advantage is that the present invention provides a system and methodology which places a higher priority on obtaining accurate survey data than on obtaining large survey samples.

Another advantage is that the present invention automatically ignores detectable and detected data which might otherwise be included in a survey to refrain from introducing unfair biases into the survey data.

The above and other advantages of the present invention are carried out in one form by a remote audience survey method. The method identifies stations to which tuners are tuned. The tuners have local oscillator signals emitted therefrom. The method calls for establishing a detection zone so that local oscillator signals emitted from tuners located in this zone are detectable through an antenna of a receiver. One of the local oscillator signals is detected at the receiver. Data describing the one of the local oscillator signals are obtained. Data describing others of the local oscillator signals present in the detection zone while the one local oscillator signal is detected at the receiver are ignored.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a tuning table which is maintained in a memory structure within the data logging computer portion of the remote audience survey system shown in FIG. 2;

FIG. 7 shows an exemplary format for a data record logged by the data logging computer portion of the remote audience survey system shown in FIG. 2;

FIG. 10 shows a block diagram of an exemplary spread sheet array produced by the compiling computer portion of the remote audience survey system shown in FIG. 2.

DETAILED DESCRIPTION OF THE PREFERRED EMBODIMENT

Figure 1:
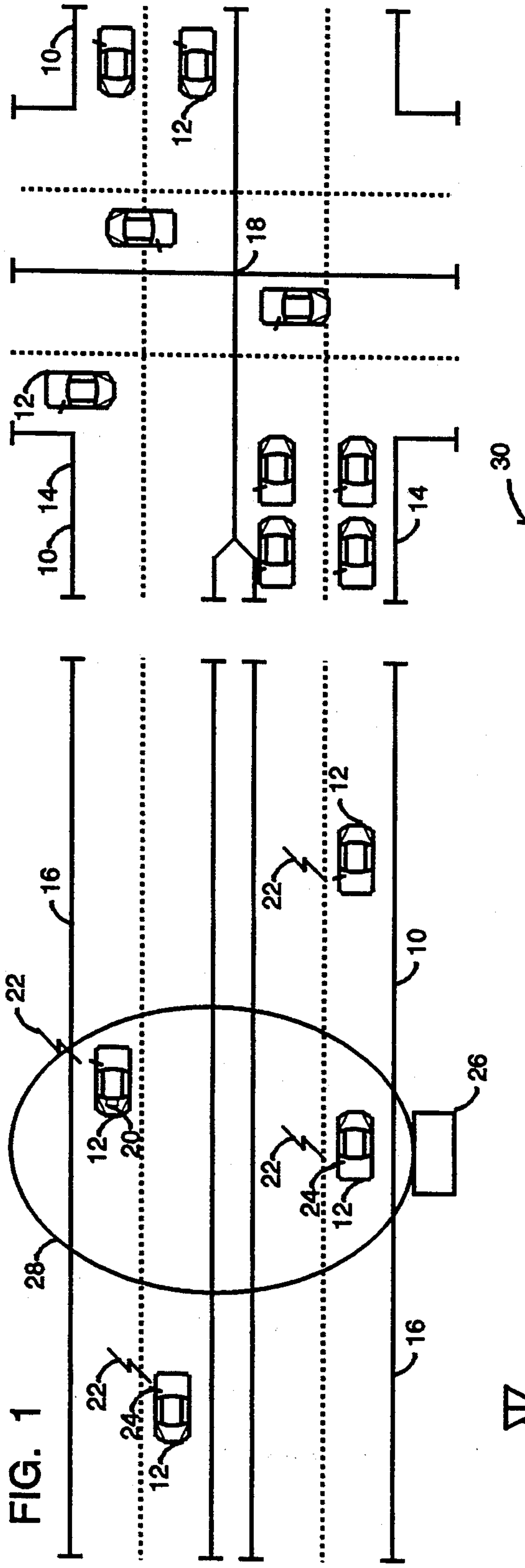
FIG. 1 shows a layout diagram of an example environment within which a preferred embodiment of the present invention may operate.

FIG. 1 shows a layout diagram of an example environment within which the preferred embodiments of the present invention may operate. FIG. 1 shows a road 10 on which any number of radio-equipped vehicles 12, such as cars, trucks, motorcycles, and the like, may travel in either of two directions. Road 10 has an intersection portion 14 and a non-intersection portion 16. Intersection portion 14 resides near an intersection 18 and represents a portion of road 10 where vehicles 12 often stop, spend longer periods of time, and bunch up or reside close to one another. In non-intersection portion 16, vehicles 12 tend to move and to spread out from one another, compared to intersection portion 14.

Many of vehicles 12 include a radio or tuner 20 for receiving commercially broadcast radio or other signals, such as conventional AM, FM, television, and the like. The currently preferred embodiment of the present invention identifies the FM radio stations to which some of radios 20 may be tuned. While this currently preferred embodiment of the present invention is limited to FM stations, those skilled in the art will appreciate that many of the features of the present invention may be successfully applied to identifying AM or television stations as well, either alone or in combination with the detection of FM stations.

Radios 20 detect broadcast stations through a well known demodulation process which requires radios 20 to generate local oscillator (LO) signals 22 having frequencies near the broadcast signals' frequencies. For FM broadcast stations, an LO signal 22 oscillates at a frequency around 10.7 MHz above the frequency of the broadcast signal to which a radio 20 is currently tuned. Thus, the frequency of a broadcast signal to which a radio 20 is tuned can be identified by detecting the presence of the tuner's LO signal 22 and identifying the frequency of the tuner's LO signal 22. LO signal 22 is a very weak signal which is emitted from radio 20 primarily by a vehicle's antenna 24. Vehicle antenna 24 couples to radio 20 and is primarily intended to receive the broadcast stations. The strength of LO signal 22 may vary significantly from vehicle 12 to vehicle 12, and the precise frequency of LO signal 22 relative to the frequency of the broadcast signal being received at a radio 20 may vary from vehicle to vehicle.

The present invention uses an antenna 26 to establish a detection zone 28 within which LO signals 22 emitted from vehicles 12 may be received. In the currently preferred embodiment of the present invention, detection zone 28 extends across road 10 to cover traffic lanes for two directions. Preferably, antenna 26 is a directional antenna with a substantially flat response through the frequency band of interest (i.e. the FM band offset by 10.7 MHz). The directionality of antenna 26 reduces the likelihood of interference from spurious signals emanating from outside detection zone 28.

Preferably, a site beside road 10 in non-intersection portion 16 thereof is selected for antenna 26. By bringing antenna 26 into proximity with road 10, and radios 20 and radio antennas 24 thereon, detection zone 28 is projected so that LO signals 22 may be received. By selecting a site for antenna 26 that is beside non-intersection portion 16 of road 10, vehicles 12 tend to move through zone 28 and remain spaced apart from one another more than would result from locating antenna 26 beside intersection portion 14. This tends to increase the sample population detectable through the system and method of the present invention, as discussed below.

Those skilled in the art will appreciate that the detection zone 28 depicted in FIG. 1 represents a zone for LO signals 22 having an average signal strength. Since the strength of LO signals 22 varies from vehicle to vehicle, zone 28 may be larger with respect to some vehicles and smaller with respect to others. Moreover, zone 28 may be used in connection with any size road 10, whether larger or smaller than the one depicted in FIG. 1.

Figure 2:
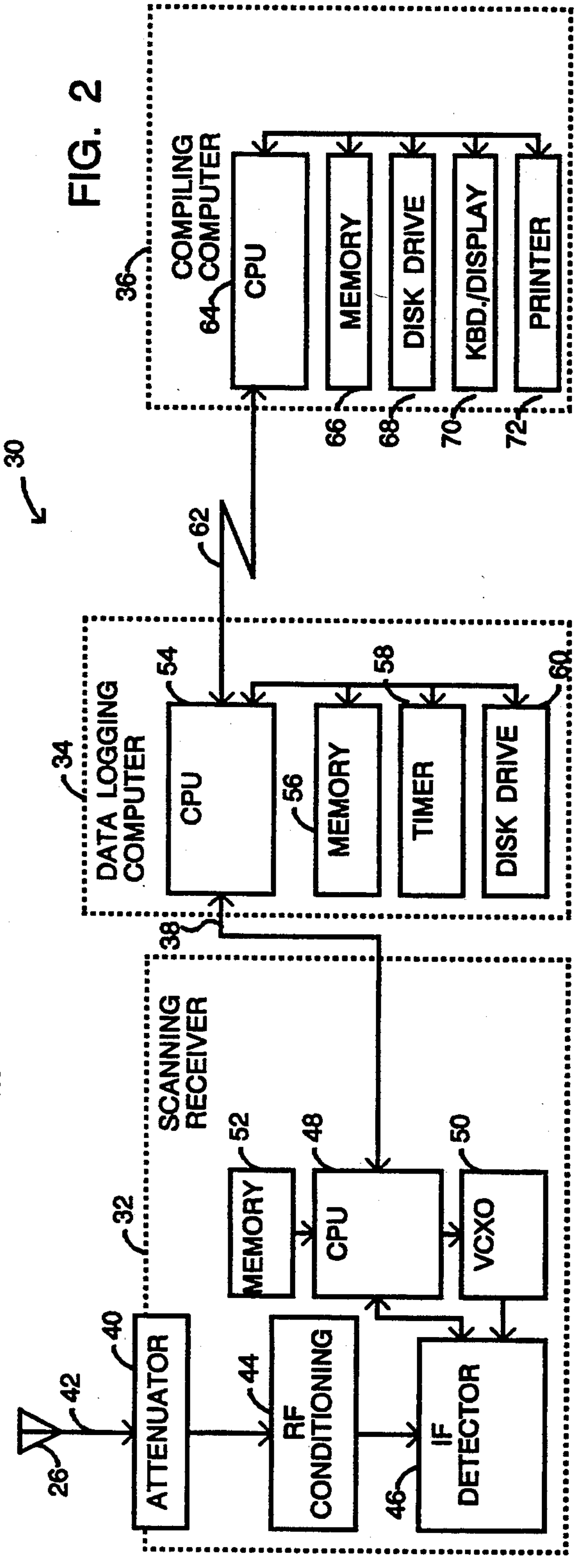
FIG. 2 shows a block diagram of a remote audience survey system.

FIG. 2 shows a block diagram of a remote audience survey system 30 constructed in accordance with a preferred embodiment of the present invention. System 30 includes antenna 26, discussed above, a scanning receiver 32, a data logging computer 34 in data communication with receiver 32, and a compiling computer 36 in data communication with data logging computer 34. Receiver 32 and data logging computer 34 are preferably located near antenna 26 beside road 10 (see FIG. 1). Due to the weak nature of LO signals 22, electrical power supplied to each of receiver 32 and computer 34 is individually conditioned through RF clamping devices (not shown) to reduce interference. In addition, RF shielding (not shown) is used around receiver 32 and computer 34 individually, and again around receiver 32 and computer 34 collectively. Data communication between receiver 32 and computer 34 takes place through an RS-232 data link, and a cable 38 that provides this link is clamped and shielded.

Antenna 26 couples to art attenuator 40 through a coaxial cable 42. Although FIG. 2 shows attenuator 40 as being included in receiver 32, those skilled in the art will understand that attenuator 40 may be an individual component located anywhere between antenna 26 and receiver 32.

Receiver 32 represents a scanning receiver. Receiver 32 includes RF conditioning circuits 44, which are fed from attenuator 40. An output of RF conditioning circuits 44 couples to an IF detector 46. Receiver 32 includes a central processing unit (CPU) 48 that has data lines coupled to IF detector 46 and a voltage controlled crystal oscillator (VCXO) 50, as well as cable 38 which conveys the above-discussed RS-232 data link to data logging computer 34. VCXO 50 couples to IF detector 46, and a memory 52 couples to CPU 48. Memory 52 stores programming instructions which define processes performed by CPU 48 and receiver 32 and stores data used and generated in accordance with these processes. Scanning receiver 32, by itself and disassociated from any processes which it may perform, represents a conventional scanner. While numerous commercially available scanners may adequately serve in the present invention, the currently preferred embodiment uses a model AR3000A receiver, available from ACE Communications of Fishers, Ind.

Figure 3:
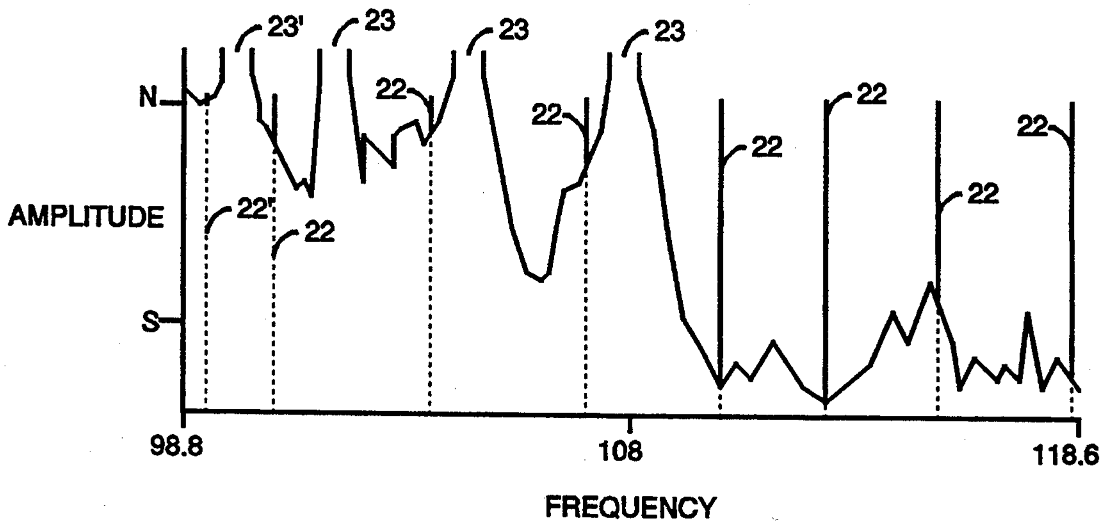
FIG. 3 shows a graph that relates desired signals to noise in a frequency range of interest to the remote audience survey system shown in FIG. 2.

FIG. 3 shows a graph that relates desired signals to noise in the frequency range of interest to remote audience survey system 30 (i.e. the FM band offset by 10.7 MHz). Those skilled in the art will appreciate that the graph depicted in FIG. 3 illustrates a hypothetical situation, and that the signal amplitude versus frequency picture experienced by system 30 (see FIG. 2) will vary from instant to instant and from location to location. Nevertheless, the background noise, in the lower half of the frequency range is usually significantly higher than the background noise in the upper half of the frequency range. This phenomenon results, at least in part, from the fact that the lower half of the LO signal frequency range resides in the FM band where a significant amount of RF energy is present. On the other hand, the higher half of the LO signal frequency range resides above the highest possible FM broadcast signal at 108 MHz, where significantly less RF energy is present.

In particular, FM signals are broadcast in the United States and other countries at odd tenth-MHz frequencies in the 88–108 MHZ range, such as 88.1 MHz, 88.3 MHz, 88.5 MHz, and so on, up to 107.9 MHz. Of course, different ones of the hundred or so possible FM broadcast station frequencies are used in different geographical areas, and no single area has FM stations licensed to broadcast at all or even a majority of the possible odd tenth-MHz frequencies to prevent interference. FIG. 3 depicts the energy from local FM broadcast stations as being concentrated primarily at peaks 23, which have such a large amplitude that they are not entirely illustrated in the graph. These peaks are centered at odd tenth-MHZ frequencies.

LO signals 22 typically have a signal strength much less than FM broadcast station signals. FIG. 3 depicts a constant amplitude for LO signals 22 of various frequencies. However, for reasons discussed above, this constant amplitude represents an average, and individual LO signals 22 may have amplitudes above or below that indicated. In fact, for many radios 20 (see FIG. 1), LO signals 22 may exhibit an amplitude less than the background noise level.

Since LO signals are offset from FM broadcast signals by 10.7 MHz, the LO signals are emitted at an even tenth-MHz frequency in the range of 98.8–118.6 MHz, such as 98.8 MHz, 99.0 MHz, 99.2 MHz, and so on, up to 118.6 MHz. Since LO signals 22 are emitted at even tenth-MHz frequencies and FM stations broadcast signals 23 at odd tenth-MHz frequencies, many LO signals 22 may still be distinguished from FM broadcast signals 23. However, when the frequency of an LO signal 22 and an FM signal 23 are very close to one another, as shown at 22' and 23' in FIG. 3, the LO signal 22 may be difficult to detect or otherwise distinguish from the background noise compared to other LO signals 22 which do not experience the same interference.

Attenuator 40 (see FIG. 2) serves to equalize the detection of the noisiest one of LO signals 22, such as LO signal 22', with the detection of the other less noisy ones of LO signals 22. Without such equalization, a lower percentage of the noisiest LO signals 22' would be detected by system 30 (see FIG. 2) compared to the percentage of other LO signals 22 detected by system 30. This lower percentage would introduce an inaccuracy into the audience surveys provided by system 30.

As is conventional, receiver 32 detects signals that have an amplitude exceeding a sensitivity parameter. The sensitivity parameter defines the lowest amplitude signal which receiver 32 may detect, and is indicated by the letter "S" in FIG. 3. The highest background noise level at an LO signal frequency is indicated by the letter "N" in FIG. 3. This level may be determined empirically at each site where antenna 26 (see FIGS. 1–2) is located. Attenuator 40 supplies an amount of attenuation corresponding to N/S. Thus, any signal, including any LO signal 22, that has an amplitude less than N will go undetected by receiver 32. By examining FIG. 3, those skilled in the art will appreciate that this configuration of receiver 32 causes many LO signals 22 that might otherwise be detectable by receiver 32 to be ignored. However, it prevents an unfair bias toward stations corresponding to the frequencies of such LO signals 22.

With reference back to FIG. 2, data logging computer 34 includes a CPU 54 which couples to at least a memory 56, a timer 58, and a disk drive 60. Memory 56 stores programming instructions which define processes performed by CPU 54 and data logging computer 34 and stores data used and generated in accordance with these processes. Timer 58 assists CPU 54 in maintaining a clock which tracks the current date and time. Disk drive 60 is used for non-volatile storage of data, preferably on a removable media such as a diskette. Of course, nothing prevents data logging computer 34 from including additional features, such as a keyboard, display, modem, and the like (not shown). In fact, in the currently preferred embodiment of the present invention, a conventional portable personal computer serves as data/logging computer 34.

Data logged by data logging computer 34 are communicated to compiling computer 36 via a data link 62. In the preferred embodiment, data link 62 is provided by physically carrying diskettes from data logging computer 34 to compiling computer 36. However, nothing prevents the implementation of more automated links, such as links established through a modem and cellular telephone. In the preferred embodiment, the logged data are thereafter kept separate from data compiled by compiling computer. This allows a variety of compilation formats to be adapted to the same data.

Compiling computer 36 includes a CPU 64, which couples to at least a memory 66, a disk drive 68, a keyboard and display 70, and a printer 72. Memory 66 stores programming instructions which define processes performed by CPU 64 and compiling computer 36 and stores data used and generated in accordance with these processes. Disk drive 68 is used for non-volatile storage of data and for obtaining data from data logging computer 34 via diskettes. Printer 72 is used for constructing paper reports of survey data. Of course, nothing prevents compiling computer 36 from including additional features, such as a hard disk drive a modem, mouse, and the like (not shown). In the currently preferred embodiment of the present invention, a conventional personal computer serves as compiling computer 36.

Figure 4:
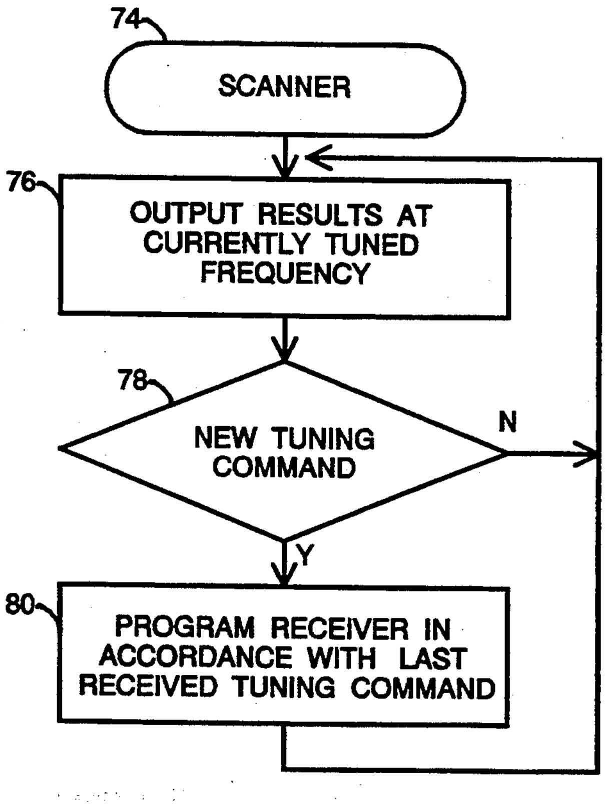
FIG. 4 shows a flow chart of a process performed by a scanning receiver portion of the remote audience survey system shown in FIG. 2.

FIG. 4 shows a flow chart of a scanner process 74 performed by scanning receiver 32 (see FIG. 2). Generally speaking, scanner process 74 causes receiver 32 to act as a slave under the control of delta logging computer 34 (see FIG. 2). Receiver 32 simply responds to instructions presented to it from data logging computer 34 over data link 38 (see FIG. 2). Procedure 74 is performed in accordance with software programming instructions stored in memory 52 of receiver 32 in a manner well known to those skilled in the art.

Procedure 74 performs a task 76 to output data describing results obtained at a frequency to which receiver 32 is currently tuned. These data are output over data link 38, from which they are received by data logging computer 34 and processed in a manner discussed below. The particular data output at task 76 generally describes whether a signal has been detected at the frequency to which receiver 32 is currently tuned. The detection information may be communicated through or accompanied by data which indicate the strength of any signal so detected. Other data may, but need not, be provided as well, such as data describing the frequency to which receiver 32 is currently tuned, attenuation factors, and/or signal types, such as AM, FM, and the like.

After task 76, a query task 78 determines whether a new tuning command has been received from data logging computer 34 via data link 38. A tuning command instructs receiver 32 to tune to a particular frequency, and may include other items of data, such as bandwidth to use in detecting signals, attenuation factors to apply to any received signals, types, such as AM or FM, of signals to detect, and the like. If no new tuning command has been received, task 78 routes program control back to task 76. Process 74 remains in a loop that includes tasks 76 and 78 until a new tuning command is received. Receiver 32 remains tuned to one frequency, and a stream of data is supplied by receiver 32 over data link 38. This stream of data tracks any signal detected at the tuned frequency.

If task 78 detects a new tuning command, a task 80 programs receiver 32 in response to the new tuning command. In particular, IF detector 46 and VCXO 50 (see FIG. 2) are programmed to carry out the new command. Program control may remain at task 80 until sufficient time has elapsed to permit acquisition of any signal that may be present in the newly commanded frequency. When such time has elapsed, program control returns to task 76 to output a stream of data describing the results in accordance with the new tuning command. Program control remains in the above-described loops consisting of tasks 76, 78, and 80 indefinitely. A human operator may interrupt process 74 by, for example, removing power from receiver 32, when data logging operations are complete for a given location.

Figure 5:
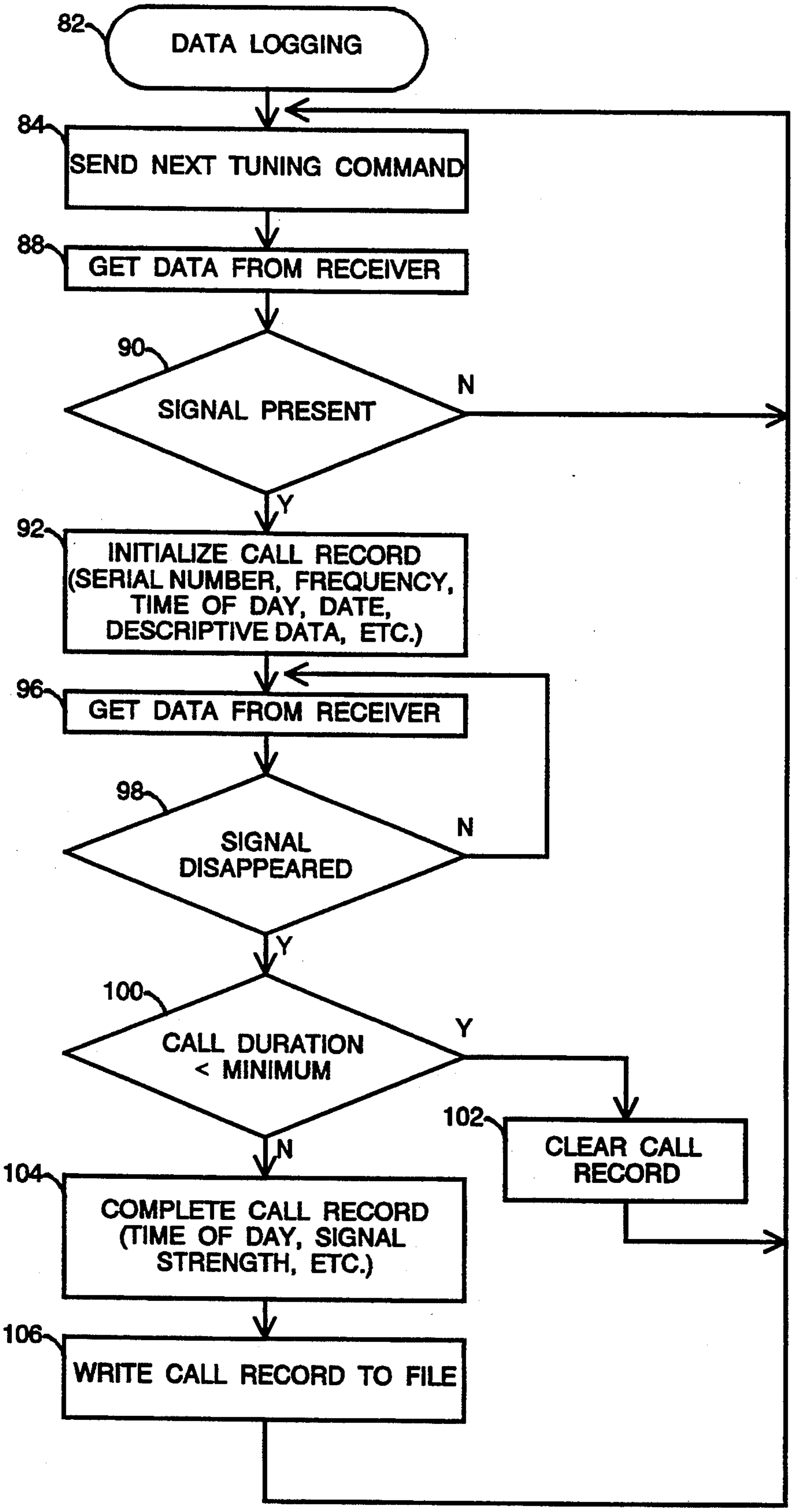
FIG. 5 shows a flow chart of a data logging process performed by a data logging computer portion of the remote audience survey system shown in FIG. 2.

FIG. 5 shows a flow chart of a data logging process 82 performed by data logging computer 34. Generally speaking, data logging process 82 controls the operation of scanning receiver 32 and logs data supplied by receiver 32. Procedure 82 is performed in accordance with software programming instructions stored in memory 56 (see FIG. 2) of computer 34 in a manner well known to those skilled in the art.

Procedure 82 performs a task 84 to send another tuning command over data link 38 to receiver 32. As discussed above, this command includes data identifying a frequency to which receiver 32 is commanded to tune along with other tuning parameters, such as signal type, attenuation, and bandwidth. The particular frequency to be sent during task 84 may be obtained by consulting a tuning table 86, an exemplary block diagram of which is shown in FIG. 6. Table 86 may be formed in a memory structure stored in memory 56 (see FIG. 2).

With reference to FIG. 6, table 86 includes a list of LO signal frequencies. As discussed above, these frequencies are even tenth-MHz frequencies in the range of 98.8–118.6 MHz. However, table 86 is constructed to include only LO signals corresponding to those FM stations which are to be included in an audience survey prepared by system 30. Typically, all FM stations reasonably detectable by typical radios 20 (see FIG. 1) in detection zone 28 (see FIG. 1) are included in an audience survey. Any stations not reasonably detectable in zone 28 are omitted from table 86 and the audience survey. No stations are listed twice in table 86. In addition, table 86 may include descriptive data in association with each LO signal frequency. Such descriptive data may include a FM station frequency corresponding to the LO signal frequency, which is 10.7 MHz less than the LO signal frequency, and the station's call letters or any other description.

With reference to FIGS. 5 and 6, task 84 may move a pointer (not shown) to a next entry in table 86 to determine which LO frequency to send to receiver 32. Thus, the next frequency tuned in by receiver 32 is the next frequency listed in table 86. Of course, when the pointer reaches the end of table 86 it may return to the beginning of table 86.

Referring back to FIG. 5, task 84 may select other data required by the tuning command from constants stored in memory 56 (see FIG. 2). In the preferred embodiment, a type parameter is set to command the receipt of an FM signal, and an attenuator parameter is set to command no attenuation. In the preferred embodiment, attenuation is performed via attenuator 40 because more precise attenuation can be obtained. However, other embodiments may perform the attenuation function within receiver 32 via software programming.

In the preferred embodiment, a bandwidth parameter is set to command a bandwidth of less than 18 KHz, and more preferably around 12 KHz. This bandwidth represents a desirable compromise between obtaining inaccurate data and missing calls, where a call represents the detection of a radio station to which a radio 20 (see FIG. 1) is tuned. Greater bandwidths lead to inaccurate data because FM broadcast signals 23 (see FIG. 3) may be confused with LO signals 22 in the lower half of the LO signal frequency band. Lesser bandwidth leads to missed calls because the precise frequencies of LO signals 22 vary from radio 20 to radio 20.

After task 84, process 82 performs a task 88 to obtain data transmitted to data logging computer 34 from receiver 32. Task 88 may desirably include a waiting period to allow receiver 32 to slew its tuning to a newly programmed frequency and to lock to any signal which may be present at this new frequency. However, any wait is typically no more than a scant fraction of a second. Once such data have been received, a query task 90 is performed to evaluate the data from receiver 32 to determine whether an LO signal 22 has been detected. In making this determination, task 90 may desirably evaluate a signal strength parameter to insure that any received LO signal 22 exhibits an amplitude above a predetermined minimum to reduce the likelihood of confusing a spurious signal with a legitimate call. If no signal is detected, or if no signal of sufficient amplitude is present, program control loops back to task 84, where receiver 32 is commanded to tune to a new frequency. Process 82 remains in a scan loop that includes tasks 84, 88, and 90 until an LO signal 22 is detected. In other words, process 82 causes receiver 32 to scan the LO signal frequencies which correspond to FM stations to be included in an audience survey until one such LO signal 22 is detected.

When task 90 decides that a legitimate LO signal 22 has been detected, process 82 performs a task 92. Task 92 is not part of the above-discussed scan loop. No new tuning command is sent to receiver 32, and receiver 32 remains tuned to the frequency where the LO signal 22 was detected. Any other LO signal 22 that might possibly be detectable by receiver 32 at this point in time is ignored.

Task 92 initializes a call record 94 in memory 56 of data logging computer 34. FIG. 7 shows a block diagram of an exemplary format for call record 94. With reference to FIGS. 5 and 7, task 92 writes data to record 94 that describe a unique serial number for the call, the frequency of the radio station detected by the call, various descriptive data, such as station call letters, LO frequency, and the like, the current date, and the current time of day. The current time of day identifies the starting time of the call. These data represent parameters that identify the particular LO signal currently being detected at receiver 32.

With reference back to FIG. 5, after task 92, a task 96 gets additional data from receiver 32. Task 96 performs substantially the same function as task 88, discussed above. After task 96, a query task 98 examines the data obtained in task 96 to determine whether the LO signal 22 being detected by receiver 32 has disappeared by falling below predetermined limits. If the LO signal 22 has not disappeared, program control returns to task 96 to obtain additional data from receiver 32. Thus, once an LO signal 22 has been detected, process 82 remains in a loop consisting of tasks 96 and 98 until the LO signal 22 is no longer detected by receiver 32.

When task 98 determines that the LO signal 22 has disappeared, a query task 100 determines whether the just-detected call lasted for at least a minimum permitted call duration. In the preferred ,embodiment, this minimum permitted call duration is around one second. This determination may be made by comparing the current time with the time of day saved in the call record above at task 92. If the call duration was less than the permitted minimum, a task 102 clears call record 94 (see FIG. 7) initialized above in task 92, and program control loops back to task 84 to cause receiver 32 to scan to the next detectable LO signal 22. This brief call will be ignored in the audience survey. Such brief calls may result from spurious signals, momentary specular reflections, radio station changes in radios 20, and the like. Such events do not represent legitimate calls and can skew the audience survey data.

When task 100 determines that the call duration exceeded the permitted minimum, a task 104 completes call record 94 (see FIG. 7). In particulars, task 104 adds the current time of day to call record 94 along with data describing the peak signal strength detected during the call. The time of day recorded in call record 94 for the end of the call when taken with the time of day recorded for the start of the call describe the call's duration. After task 104, a task 106 writes call record 94 to a file which is now or may later be written to disk drive 60 (see FIG. 2) on a removable diskette. Thus, task 106 causes call record 94 to be logged on a substantially permanent and non-volatile medium.

After task 106, program control loops back to task 84, where receiver 32 is commanded to scan for another LO signal 22. Thus, process 82 remains in an indefinite loop. The LO signal frequency band is scanned for an LO signal 22. When such a signal is detected, other LO signals are ignored until the detected LO signal 22 is no longer detectable at receiver 22.

The ignoring of other LO signals while one LO signal is detectable prevents a particular type of skew in audience survey data. Hence, a situation where multiple radios are tuned to a common station within detection zone 28 is prevented from skewing the audience survey data. While the ignoring of other LO signals that are otherwise detectable reduces the sample population, it reduces calls recorded for all stations included in the survey in proportion to the actual number of radios 20 tuned to those stations. Consequently, no unfair bias is introduced into the survey data. On the other hand, if other detectable LO signals were logged while more than one LO signal could be detected, disproportionately fewer calls would be recorded for popular stations. Such an unfair result would occur due to difficulty in determining when more than one radio 20 in detection zone 28 is tuned to the same station, and more popular stations are likely to have multiple calls concurrently in detection zone 28.

In the preferred embodiment of the present invention, receiver 32 continuously performs process 74 (see FIG. 4) and data logging computer 34 continuously performs process 82 at any given location for any period of time. Over a duration of 48–96 hours, thousands of calls are typically logged. Of course, those skilled in the art will appreciate that the number of calls logged depends upon the amount of traffic at the location and other factors. A diskette upon which these calls have been logged is then transported to compiling computer 36 (see FIG. 2), which may be located at any convenient location, whether or not near detection zone 28 (see FIG. 1). Antenna 26, receiver 32, and data logging computer 34 may then continue to log data at the same location, be moved to a different location to log calls at the different location, or simply go inactive.

Figure 8:
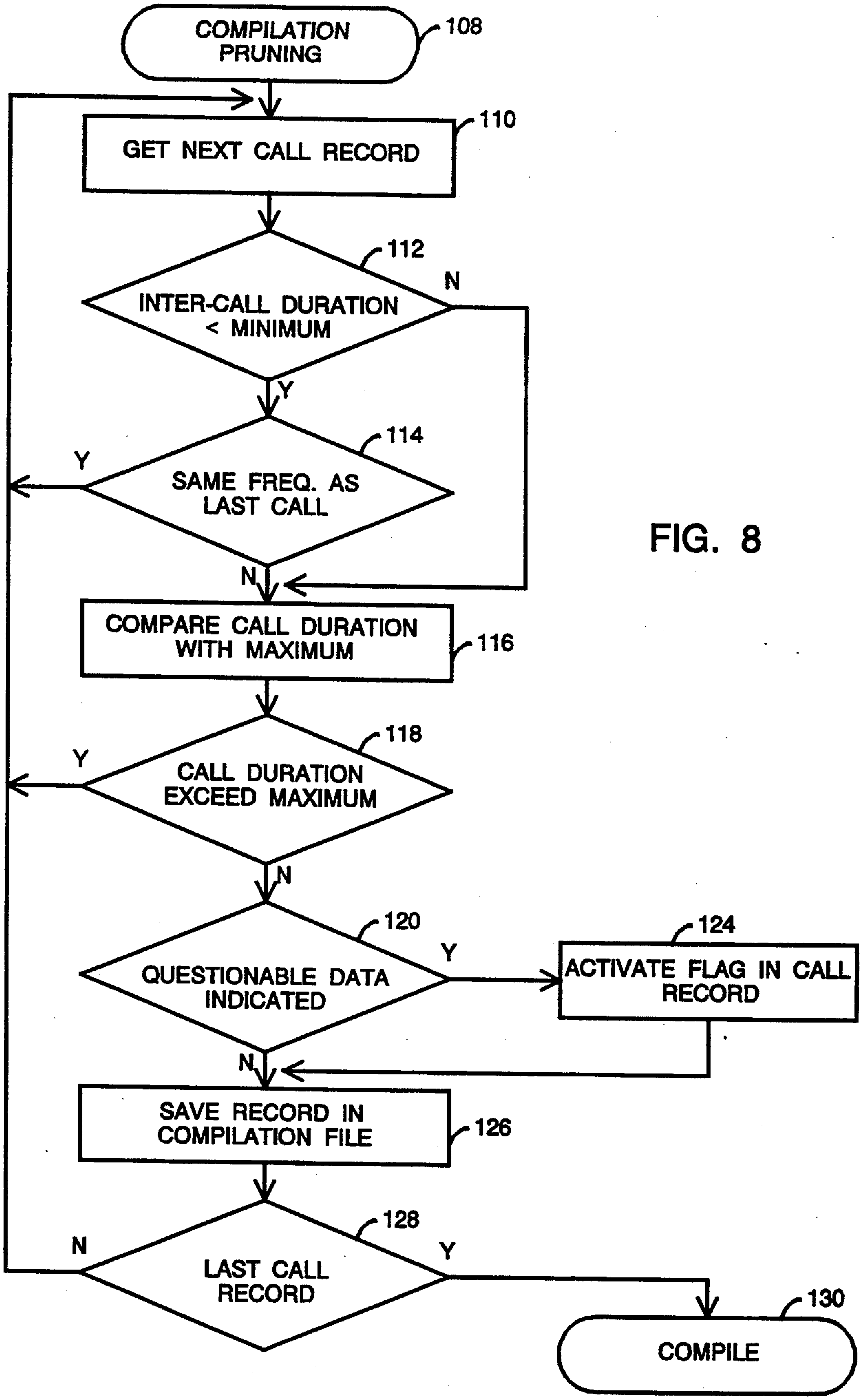
FIG. 8 shows a flow chart of a compilation pruning process performed by a compiling computer portion of the remote audience survey system shown in FIG. 2.

Those skilled in the art will appreciate than no human operator is required for the operation of receiver 32 or data logging computer 34 or for the interpretation of received data. This provides an accuracy benefit because results are not dependent upon the skill and concentration of an operator. It also provides a cost benefit because high salaries for skilled operators may be omitted along with the provisions for a comfortable environment near a monitoring site within which a human operator might work, FIG. 8 shows a flow chart of a compilation pruning process 108 that is performed by compiling computer 36. Generally speaking, compilation pruning process 108 prunes certain call records 94 from those contained in the file of call records 94 logged as described above. Process 108 prunes call records 94 which are likely to describe illegitimate calls that might skew the survey data. Procedure 108 is performed in accordance with software programming instructions stored in memory 66 (see FIG. 2) of computer 36 in a manner well known to those skilled in the art.

Procedure 108 iteratively examines each logged call record 94 (see FIG. 7) in a loop which will be described below. Procedure 108 performs a task 110 to get the next call record 94 from the file. Next, a query task 112 determines whether the inter-call duration, which transpires between the end of the previously examined call and the start of the currently examined call, is less than a minimum predetermined duration. In the preferred embodiment this minimum duration is set at around eight seconds for normal city traffic speeds. However, this minimum duration may be adjusted upward or downward to accommodate slower or faster traffic. If this inter-call duration is less than the minimum duration, then the possibility exists that an illegitimate call has been recorded. If so, a query task 114 is performed to examine the signal frequencies recorded for this call record and the previous call record. If these frequencies are the same, then the call is treated as an illegitimate call, and program control proceeds back to task 110 to examine the next call record 94 from the file. The data recorded in the call record will simply be ignored.

Tasks 112 and 114 together test for a situation where two consecutive calls are recorded for the same station within the minimum duration. In some instances, this situation may represent two legitimate calls. However, in other instances it may result from a single radio 20 whose LO signal 22 was momentarily interrupted. Such an interruption may, for example, result from a low level signal that can barely be detected in the first place or from an intervening vehicle 12 passing between the LO signal's emitting radio 20 and antenna 26 (see FIG. 1). In the case of a momentary interruption, the recording of two calls for a single radio would skew audience survey data in favor of stations where such an occurrence would be more likely, such as stations whose LO frequencies reside in the lower half of the LO frequency band where greater noise exists or for stations that are more popular.

If the inter-call duration is not less than the minimum duration or the inter-call duration is less than the minimum duration but the calls are for different frequencies, program control proceeds to task 116. Task 116 compares the duration recorded in the call record 94 being examined to a predetermined maximum allowed period of time. In the preferred embodiment, this maximum allowed period of time is set at around 10 minutes. If the call record indicates a duration greater than this maximum, the call is considered to be illegitimate, and program control returns to task 110 to examine the next call record 94. The data included in this call record 94 will be ignored.

Vehicles 12 should normally pass through detection zone 28 within a matter of a few seconds. When a call record indicates a call duration greater than the maximum allowed period of time, receiver probably detected something other than a radio 20. For example, an interfering noise source may have come into the vicinity. Such call data skews audience survey data, typically in favor of stations whose LO signals oscillate in the FM broadcast signal frequency band.

When task 118 determines that the call record 94 indicates a call duration less than the maximum allowed, the call may be considered legitimate for the moment, and program control proceeds to a query task 120. Task 120 may examine data in the call record to determine whether something unusual is indicated. For example, task 120 may examine the call's signal strength to determine whether an unusually high signal was received. Alternatively, task 120 may examine the call's duration to determine whether an unusually long call was recorded, even though the call duration may be less than the maximum allowed. Such events, and perhaps others, by themselves do not indicate bad data but may indicate bad data if they occur in several different call records 94. Accordingly, when such events are detected, a task 124 activates a flag associated with the call record 94 for later consideration.

After task 124 or when task 120 fails to find questionable data in the call record 94, process 108 performs a task 126. Task 126 saves the call record 94 in a compilation file. Next, a query task 128 determines if the call record 94 was the last call record 94 to be examined for pruning. If not the last call record 94, program control returns to task 110 to examine the next call record 94. Process 108 remains in this loop until all call records 94 have been examined. Potentially biasing data are automatically pruned away from the remaining call records 94. When all call records 94 have been examined, program control proceeds to a compile process 130. Of course, those skilled in the art will appreciate that program control need not automatically proceed to process 130, and that process 130 may be described by an entirely different computer program from process 108.

Figure 9:
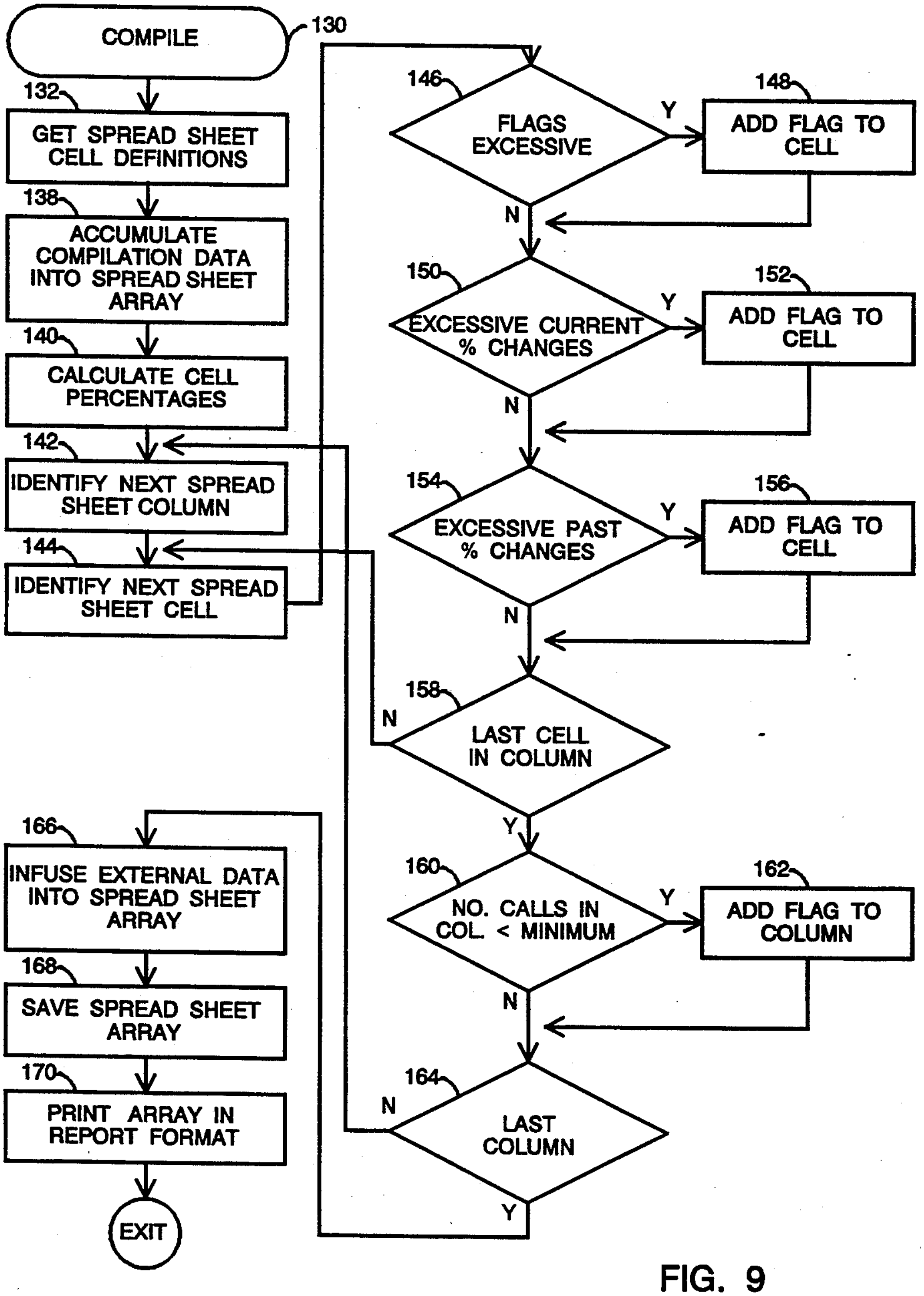
FIG. 9 shows a flow chart of a compile process performed by the compiling computer portion of the remote audience survey system shown in FIG. 2.

FIG. 9 shows a flow chart of compile process 130 that may be performed by compiling computer 36. Generally speaking, compile process 130 infuses data from the compilation file produced by pruning process 108 (see FIG. 8) into a spread sheet array, an example of which is illustrated by FIG. 10. Procedure 130 is performed in accordance with software programming instructions stored in memory 66 (see FIG. 2) of computer 36 in a manner well known to those skilled in the art.

Process 130 performs a task 132 to get cell definitions for a spread sheet 134, an example of which is depicted in FIG. 10. Spread sheet 134 is divided into cells 136 arranged in rows and columns. Several items of data may be included in each cell 136. In the preferred embodiment, a column is provided for each hour of a day and a row is provided for each radio station to be included in an audience survey. Task 132 defines these rows and columns. However, those skilled in the art will appreciate that spread sheet row and column definitions are flexible and may change from application to application. For example, additional columns may be added to depict blocks of several hours.

With reference back to FIG. 9, after task 132, a task 138 processes the compilation file to accumulate the data contained therein, or at least portions of it, into spread sheet 134 (see FIG. 10). Task 138 determines the number of calls recorded for each station during each hour of the day and any other factors which may be deemed valuable for the particular report being generated. Next, a task 140 calculates cell percentages for each cell 136 in the array of spread sheet 134. The percentages are calculated with respect to the total number of calls recorded for each column in spread sheet 134 and provide normalized data for comparing from hour to hour.

After task 140, a loop is instigated to examine the various cells 136 and columns of spread sheet 134. In the preferred embodiment, all cells of one column are examined before examining cells of another column. Thus, a task 142 identifies the next spread sheet column to examine, and a task 144 identifies the next cell within the currently identified column to examine. After task 144 identifies a subject cell 136, a series of determinations are made to flag data that might potentially be bad. Any number of determinations may be made. For example, a query task 146 may determine whether an excessive number of flags have been recorded for the subject cell 136. Such flags were set in pruning process 108 (see FIG. 8) at task 124. If an excessive number is found, a task 148 may add a descriptive flag to the subject cell 136.

After task 148 or when task 146 fails to find an excessive number of flags, a query task 150 may determine whether an excessive percentage change is reported for the cell from the previous hour. An excessive change in market share percentage between two consecutive hours may indicate bad data. Thus, when this situation is detected, a task 152 may add a descriptive flag to the subject cell 136. After task 152 or when task 150 fails to find an excessive market share percentage change in consecutive hours, a query task 154 may determine whether an excessive percentage change is reported for the cell from a corresponding cell for a corresponding geographical location in a spread sheet 134 for a previous month or week. A spread sheet 134 for a previous month or week may be obtained from memory 66 or disk drive 68 (see FIG. 2). Again, such an excessive change in market share percentage between two consecutive months or weeks may indicate bad data. If an excessive change is detected, a task 156 may add a descriptive flag to the subject cell 136.

After task 156 or when task 154 fails to find an excessive market share percentage change from a previous month or week, a query task 158 determines whether the subject cell 136 represents the last cell 136 to be examined in the subject column of spread sheet 134. If not, program control loops back to task 144 to examine the next cell in the column. If the last cell 136 in the column has been examined, a query task 160 determines whether the total number of calls recorded in the column is greater than a predetermined minimum number. If less than the minimum number is detected, the sample population of call records is in danger of failing to be a statistically significant sample size. This situation may occur when a large number of call records 94 have been pruned through process 108 (see FIG. 8) or when vehicle traffic has been low. If this situation is detected, a task 162 may add a descriptive flag to the subject column of spread sheet 134. After task 162 or when task 160 determines that the number of calls is greater than the minimum, a query task 164 determines whether the subject column is the last column in spread sheet 134. If other columns remain to be evaluated, program control loops back to task 142 to examine the remainder of spread sheet 134. When the entire spread sheet 134 has been evaluated, process 130 proceeds to a task 166 to continue to process spread sheet 134.

Task 166 may infuse external data into the array of spread sheet 134. Such external data may, for example, represent car count numbers for the location monitored. Car count numbers represent the total number of cars passing a particular point. Since the system and method of the present invention do not record all vehicles 12 (see FIG. 1) passing through detection zone 28 for numerous reasons discussed above, such car count numbers may be multiplied by percentage numbers to give an indication of the total number of vehicles 12 listening to particular stations during particular hours at the monitored location. Alternatively, such external data may represent population or traffic count data for the area, such as a city or the like, where detection zone 28 was located. Such population data, when infused into spread sheet 134 by multiplying by percentage data, provide a common denominator allowing spread sheets 134 for different areas to be compared with one another and compiled together into statistics for large areas made up of a conglomerate of smaller areas.

After task 166, a task 168 saves the spread sheet 134 on a non-volatile storage medium, and an optional task 170 may be performed to print the spread sheet array or at least portions of it, in a particular report format, and process 130 exits.

The flagged cells and columns, as discussed above in connection with tasks 146–162, may be examined by a human operator for judgment calls pertaining to whether or not bad data are indicated. If an operator decides that bad data are indicated, process 130 may be repeated by adjusting the spread sheet cell definitions in task 132 to omit particular days or hours from the compilation. If insufficient data result, additional data may be collected at the same location, as discussed above in connection with FIGS. 1–7.

In summary, the present invention provides an improved system and method for determining the stations to which tuners may be tuned. Audience survey data are gathered without requiring audience participation or constant monitoring by a skilled human operator. The system and methodology of the present invention place a higher priority on obtaining accurate survey data than on obtaining large survey samples. Accordingly, the present invention automatically ignores detectable and/or detected delta which might otherwise be included in a survey in order to prevent the introduction of unfair biases into the survey data. Nevertheless, due to the automated data gathering technique of the present invention, large sample populations may still be monitored at low cost. Improved accuracy in audience survey data is obtained through signal and data processing. Improved precision in audience survey data is obtained because detection zones may be established at any number of different locations, and audience survey data from these locations may be combined after weighing survey results with external data, such as population or other data.

The present invention has been described above with reference to preferred embodiments. However, those skilled in the art will recognize that changes and modifications may be made in these preferred embodiments without departing from the scope of the present invention. For example, the receiver of the present invention need not be a scanning receiver but may be a spectrum analyzer or multiple receivers tuned to different stations and operated in parallel. Moreover, those skilled in the art can distribute the processing functions described herein between a receiver, data logging computer, and compiling computer differently than indicated herein, or those skilled in the art can combine functions which are indicated herein as being performed at different components of the system. Furthermore, those skilled in the art will appreciate that the present invention will accommodate a wide variation in the specific tasks and the specific task ordering used to accomplish the processes described herein. These and other changes and modifications which are obvious to those skilled in the art are intended to be included within the scope of the present invention.

What is claimed is:

1. A remote audience survey method for identifying radio stations to which tuners are tuned, said tuners having local oscillator signals emitted therefrom, and said method comprising the steps of:

establishing a detection zone so that said local oscillator signals emitted therein from tuners tuned to different ones of said radio stations are detectable through an antenna of a receiver;

detecting one of said local oscillator signals at said receiver;

obtaining data describing said one of said local oscillator signals; and ignoring data describing others of said local oscillator signals emitted from within said detection zone while said one local oscillator signal is detected at said receiver.

2. A remote audience survey method as claimed in claim 1 wherein said obtaining step comprises the step of recording data which identify a time of day when and a duration for which said one local oscillator signal is detected at said receiver.

3. A remote audience survey method as claimed in claim 1 additionally comprising the step of ignoring said data describing said one of said local oscillator signals unless said one local oscillator signal is detected at said receiver for at least a predetermined duration.

4. A remote audience survey method as claimed in claim 1 additionally comprising the steps of:

repeating said detecting, obtaining, and ignoring steps after said one local oscillator signal is no longer detected at said receiver;

determining when two consecutively detected local oscillator signals have substantially the same frequency and are detected within a predetermined duration of one another; and ignoring data describing one of said two consecutively detected local oscillator signals.

5. A remote audience survey method as claimed in claim 1 wherein said obtaining step comprises the step of recording data which identify a duration over which said one local oscillator signal is detected at said receiver, and said method additionally comprises the steps of:

comparing said duration with a predetermined period of time; and ignoring said data describing said one of said local oscillator signals when said comparing step indicates that said duration exceeds said predetermined period of time.

6. A remote audience survey method as claimed in claim 1 wherein said tuners reside in vehicles, and said establishing step comprises the step of positioning said receiver antenna beside a road on which said vehicles travel so that said detection zone extends across said road.

7. A remote audience survey method as claimed in claim 6 wherein said road has intersection and non-intersection portions, and said establishing step comprises, prior to said positioning step, the step of selecting a site for said receiver antenna which is beside said non-intersection portion of said road.

8. A remote audience survey method as claimed in claim 1 wherein said tuners are tuned to any of a plurality of odd tenth-MHz frequencies in the range of 88.1–107.9 MHz, and said detecting step comprises the step of tuning said receiver to detect said one local oscillator signal, said tuning step monitoring one or more of a plurality of even tenth-MHz frequencies in a local oscillator range of 98.8–118.6 MHz.

9. A remote audience survey method as claimed in claim 8 wherein:

a noise level in said detection zone for a noisiest one of said plurality of local oscillator frequencies is greater than noise levels at others of said plurality of local oscillator frequencies; and said method additionally comprises the step of configuring said receiver so that a sensitivity parameter prevents detection of local oscillator signals that have signal levels approximately less than said noise level at said noisiest one of said plurality of frequencies.

10. A remote audience survey method as claimed in claim 8 additionally comprising the step of configuring said receiver to detect local oscillator signals confined within a bandwidth of less than approximately ±18 KHz for any of said plurality of frequencies in said local oscillator range.

11. A remote audience survey method as claimed in claim 8 wherein said tuning step comprises the step of scanning said plurality of frequencies in said local oscillator range to detect said one local oscillator signal.

12. A remote audience survey method for identifying stations to which tuners are tuned, said tuners having local oscillator signals emitted therefrom, and said method comprising the steps of:

bringing an antenna of a receiver into proximity with first and second ones of said tuners so that first and second ones of said local oscillator signals can be received at said receiver and so that relative movement occurs between said receiver antenna and said tuners;

detecting said first local oscillator signal;

recording identification parameters for said first local oscillator signal;

determining when said first local oscillator signal is no longer detected at said receiver;

refraining from recording identification parameters for said second local oscillator signal between said detecting and determining steps; and repeating said detecting, recording determining, and refraining steps for other ones of sad local oscillator signals after said first local oscillator signal is no longer detected at said receiver.

13. A remote audience survey method as claimed in claim 12 wherein said recording step comprises the step of recording data which identify a duration over which said first local oscillator signal is detected at said receiver.

14. A remote audience survey method as claimed in claim 12 additionally comprising the step of ignoring said data describing said first local oscillator signal unless said first local oscillator signal is detected at said receiver for at least a predetermined duration.

15. A remote audience survey method as claimed in claim 12 additionally comprising the steps of:

determining when two consecutively detected local oscillator signals have substantially the same frequency and are detected within a predetermined duration of one another; and ignoring data describing one of said two consecutively detected local oscillator signals.

16. A remote audience survey method as claimed in claim 12 wherein said recording step identifies a duration for which said first local oscillator signal is detected at said receiver, and said method additionally comprises the steps of:

comparing said duration with a predetermined period of time; and ignoring said data describing said first local oscillator signal when said comparing step indicates that said duration exceeds said predetermined period of time.

17. A remote audience survey method as claimed in claim 12 wherein said identification parameters for any local oscillator signal are associated with a call record, said repeating step is performed a multiplicity of times to generate a multiplicity of call records, and said method additionally comprises the steps of:

accumulating said multiplicity of call records into an array of cells; and printing a report which includes information obtained from said compiling step.

18. A remote audience survey method as claimed in claim 12 wherein said tuners are tuned to any of a plurality of odd tenth-MHz frequencies in the range of 88.1–107.9 MHz, and said detecting step comprises the step of tuning said receiver to detect said first local oscillator signal, said tuning step monitoring one or more of a plurality of even tenth-MHz frequencies in a local oscillator range of 98.8–118.6 MHz.

19. A remote audience survey method as claimed in claim 18 wherein:

a noise level at said receiver for a noisiest one of said plurality of local oscillator frequencies is greater than noise levels t others of said plurality of local oscillator frequencies; and said method additionally comprises the step of configuring said receiver so that a sensitivity parameter prevents detection of local oscillator signals that have signal level approximately less than said noise level at said noisiest one of said plurality of frequencies.

20. A remote audience survey system for identifying FM radio stations to which radios are tuned, said radios having local oscillator signals emitted therefrom at a plurality of even tenth-MHz frequencies in a local oscillator range of 98.8–118.6 MHz, said system comprising:

an antenna for establishing a detection zone within which first and second local oscillator signals are occasionally emitted;

a receiver coupled to said antenna;

means, in data communication with said receiver, for identifying said first local oscillator signal;

means, coupled to said identifying means, for determining when said first local oscillator signal is no longer detectable at said receiver;

means, coupled to said identifying means, for recording data describing said first local oscillator signal; and means, coupled to said determining means, for ignoring data describing said second local oscillator signal until said first local oscillator signal is no longer detectable at said receiver.

21. A remote audience survey system as claimed in claim 20 additionally comprising timing means, coupled to said determining means, for ignoring said data that describe said first local oscillator signal unless said first local oscillator signal is detected by said receiver for at least a predetermined duration.

22. A remote audience survey system as claimed in claim 20 additionally comprising timing means, coupled to said recording means and said determining means, for indicating a duration over which said first local oscillator signal is detected at said receiver.

23. A remote audience survey system as claimed in claim 20 wherein:

a noise level at said receiver for a noisiest one of said plurality of local oscillator frequencies is greater than noise levels at others of said plurality of local oscillator frequencies; and said receiver is configured so that a sensitivity parameter of said receiver prevents detection of local oscillator signals that have signal levels approximately less than said noise level at said noisiest one of said plurality of frequencies.

24. A remote audience survey system as claimed in claim 20 additionally comprising:

means, in data communication with said determining means and said identifying means, for indicating when two consecutively detected local oscillator signals have substantially the same frequency and are detected within a predetermined duration of one another; and means, coupled to said indicating means, for ignoring data describing one of said two consecutively detected local oscillator signals.

25. A remote audience survey system as claimed in claim 20 additionally comprising:

timing means, coupled to said determining means, for indicating a duration over which said first local oscillator signal is detected at said receiver; and means, coupled to said timing means, for ignoring said data describing said first local oscillator signal when said timing means indicates that said duration exceeds a predetermined period of time.

* * * * *

UNITED STATES PATENT AND TRADEMARK OFFICE

CERTIFICATE OF CORRECTION

PATENT NO. : 5,410,724

DATED : Apr. 25, 1995

INVENTOR(S) : David G. Worthy

It is certified that error appears in the above-indentified patent and that said Letters Patent is hereby corrected as shown below:

Column 6, line 59, reads "data/logging" and should read --data logging--.

Column 16, line 59, reads "sad" and should read --said--.

Signed and Sealed this

Twenty-seventh Day of June, 1995

Attest:

Bruce Lehman

BRUCE LEHMAN

Attesting Officer

Commissioner of Patents and Trademarks